UNITED STATES PATENT OFFICE.

JOSEPH KOETSCHET, OF LYON, AND ANDRÉ BARBIER, OF ST. FONS, NEAR LYON, FRANCE, ASSIGNORS TO SOCIÉTÉ CHIMIQUE DES USINES DU RHÔNE, ANCIENNEMENT GILLIARD, P. MONNET ET CARTIER, OF PARIS, FRANCE, A CORPORATION OF FRANCE.

MANUFACTURE OF NITROPHENYLNITROMETHANES, THEIR HOMOLOGUES AND DERIVATIVES.

1,015,496.     Specification of Letters Patent.     Patented Jan. 23, 1912.

No Drawing.     Application filed March 4, 1911. Serial No. 612,201.

*To all whom it may concern:*

Be it known that we, JOSEPH KOETSCHET, of Lyon, France, and ANDRÉ BARBIER, of St. Fons, near Lyon, France, have invented certain new and useful Improvements in the Manufacture of Nitrophenylnitromethanes, Their Homologues and Derivatives, of which the following is a specification.

It is known that the action of highly concentrated nitric acid or of mixtures of nitric and sulfuric acid upon nitrotoluenes leads to a number of isomeric nitrotoluenes substituted in the nucleus (see Liebig's *Annalen* 155 (1870) page 25, and *Berichte der Deutschen Chemischen Gesellschaft* 27 (1894) pages 2209 and 2210). On the other hand (see *Berichte der Deutschen Chemischen Gesellschaft* 28 (1895) page 1860 and page 1864 lines 3–8) Konovalow has allowed weak nitric acid (20 per cent.) to act upon nitro toluenes with a view to obtaining nitro phenylnitromethanes. We have found that nitric acid of this concentration reacts with nitro toluenes only under pressure and at elevated temperature, and that this operation substantially yields ortho nitrobenzoic acid and greasy by-products; we were unable to find that nitrophenyl nithromethanes were formed in appreciable quantities in this way.

Contrary to the known art we have found that by employing a moderately strong or a strong nitric acid (for example 40–90 per cent.), without pressure, so that the water liberated can readily escape and the acid be consequently kept within certain limits of concentration, it is possible to convert the nitro-toluenes, their homologues and substitution products (hereinafter included in the term "bodies of the nitrotoluene type") into the corresponding nitro phenyl nitro methanes in a manner which can be readily carried out technically. With orthonitrotoluene, for example, the valuable product

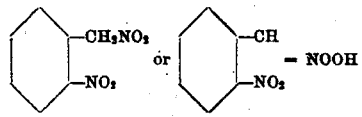

which has hitherto only been produced pure by the action of silver nitrite on nitrobenzyliodid, can be readily obtained.

The conditions which allow of confining the action of the nitric acid to the formation of nitrophenylnitromethanes and of avoiding the oxidation of these bodies and the formation of by-products are:—

1. The employment of as strong a nitric acid as possible, at the proper temperature. The degree of concentration of this acid is only limited by the possibility of nitration in the benzene nucleus. It is clear that a less strong acid can be employed if it is given an opportunity to concentrate in the course of the operation.

2. The employment of an excess of nitrotoluene. By suitably combining these conditions the result can be attained of limiting to a minimum the formation of nitrobenzoic acid and the dinitrotoluenes.

For each body to be nitrated, a certain concentration at a given temperature is necessary in order to obtain the best results.

Example: Orthonitrotoluene is heated to 110–120° C. Nitric acid of 40°–45° Baumé corresponding to 60 per cent.–80 per cent. strength is gradually run in, the same temperature being maintained. The water formed and a portion of the nitric acid escape and are taken up outside the reaction vessel. When the reaction is finished, the product is washed with water and the nitrobenzoic acid and nitrobenzaldehyde are extracted by treatment with sodium carbonate and sodium bisulfite solutions. The ortho nitrophenylnitromethane is then separated from excess nitrotoluene by prolonged extraction with caustic soda solution. After precipitation with an acid it is already pure and melts at about 67° C.

The isomeric, homologous and substituted nitrophenyl-nitromethanes can be obtained in a similar way by treatment of the corresponding nitro toluenes, and are hereinafter included in the term "bodies of the nitrophenyl nitromethane type."

The following for example can be obtained in a similar way:—

From paranitrotoluene, paranitrophenyl nitro-methane m. p. 91° C.

From para-chlor-o-nitrotoluene, para-chlor-o-nitrophenyl-nitromethane, m. p. 112° C.

From para-brom-o-nitro-toluene, parabrom-o-nitrophenyl-nitromethane, m. p. 113.5° C.

From ortho-chlor-o-nitrotoluene, ortho-chlor-o-nitro-phenylnitromethane, m. p. 82° C.

From ortho-nitro-m-xylene, 3 methyl 6 nitro phenylnitromethane, m. p. 86.5° C.

From ortho-nitro-m-xylene, 3 methyl 2 nitro phenylnitromethane, m. p. 64° C.

What we claim and desire to secure by Letters Patent is:—

1. A process for the manufacture of bodies of the nitrophenylnitromethane type, consisting in treating a body of the nitrotoluene type with nitric acid and keeping the acid at a concentration not below 40 per cent. during the reaction.

2. A process for the manufacture of bodies of the nitrophenylnitromethane type, consisting in treating a body of the nitrotoluene type with nitric acid and keeping the acid at a concentration not below 40 per cent. during the reaction, the body treated being employed in excess relatively to the nitric acid which enters into reaction, substantially as described.

3. A process for the manufacture of bodies of the nitrophenylnitromethane type, consisting in treating a body of the nitrotoluene type with nitric acid of about 40–90 per cent. strength without pressure, removing the water liberated and maintaining the acid at a strength not below 40 per cent., the body treated being employed in excess relatively to the nitric acid which enters into reaction, substantially as described.

4. A process for the manufacture of ortho-nitro-phenyl nitro-methane, consisting in heating ortho nitro toluene with nitric acid of about 60–80 per cent. strength, without pressure, and removing the water liberated in the reaction.

5. A process for the manufacture of ortho-nitro-phenyl nitromethane, consisting in heating ortho nitrotoluene in excess with nitric acid of about 60–80 per cent. strength, without pressure, and removing the water liberated in the reaction.

In witness whereof, we have hereunto signed our names in the presence of two subscribing witnesses.

JOSEPH KOETSCHET.
ANDRÉ BARBIER.

Witnesses:
BENOÎT PENARD,
MARIN VACHON.

Copies of this patent may be obtained for five cents each, by addressing the "Commissioner of Patents, Washington, D. C."